US010984251B2

(12) United States Patent
Yang et al.

(10) Patent No.: US 10,984,251 B2
(45) Date of Patent: Apr. 20, 2021

(54) PERSON RE-IDENTIFICATION METHOD, PERSON RE-IDENTIFICATION SYSTEM AND IMAGE SCREENING METHOD

(71) Applicant: INDUSTRIAL TECHNOLOGY RESEARCH INSTITUTE, Hsinchu (TW)

(72) Inventors: Yao-Chin Yang, Hsinchu (TW); Ming-Hung Cheng, New Taipei (TW); Chih-Chung Kao, Pingtung County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/521,121

(22) Filed: Jul. 24, 2019

(65) Prior Publication Data

US 2020/0302186 A1   Sep. 24, 2020

(30) Foreign Application Priority Data

Mar. 19, 2019   (TW) ................. 108109409

(51) Int. Cl.
*G06K 9/62*   (2006.01)
*G06T 7/292*   (2017.01)
(Continued)

(52) U.S. Cl.
CPC ..... *G06K 9/00771* (2013.01); *G06K 9/00369* (2013.01); *G06K 9/6255* (2013.01);
(Continued)

(58) Field of Classification Search
CPC ............................ G06K 9/00771; G06T 7/292
See application file for complete search history.

(56) References Cited

U.S. PATENT DOCUMENTS 8,488,913 B2   7/2013   Lin et al.
9,087,297 B1 *   7/2015   Filippova ........... G06K 9/00718
(Continued)

FOREIGN PATENT DOCUMENTS

CN   102843511 A   12/2012
CN   103488744 A   1/2014
(Continued)

OTHER PUBLICATIONS

Chen et al., "Similarity Learning with Spatial Constraints for Person Re-identification", 10 pages.
(Continued)

*Primary Examiner* — Irfan Habib
(74) *Attorney, Agent, or Firm* — Birch, Stewart, Kolasch & Birch LLP (57) ABSTRACT

A person re-identification method, a person re-identification system and an image screening method are provided. The person re-identification method includes the following steps. A plurality of identified images of an identified person are analyzed to obtain an interrelated array, which records a plurality of degrees of association among the identified images. The interrelated array is converted to a directed graph having at least one connected group. A representative path of each connected group is obtained. According to each representative path, a part of the identified images are outputted as at least one representative image set for performing a person re-identification process on an image to be identified.

20 Claims, 10 Drawing Sheets

(51) Int. Cl.
*G06N 20/00* (2019.01)
*G06K 9/00* (2006.01)
*G06T 11/60* (2006.01)

(52) U.S. Cl.
CPC ......... *G06K 9/6256* (2013.01); *G06N 20/00* (2019.01); *G06T 7/292* (2017.01); *G06T 11/60* (2013.01); *G06T 2207/10021* (2013.01); *G06T 2207/30196* (2013.01); *G06T 2207/30232* (2013.01); *G06T 2207/30241* (2013.01)

(56) References Cited

U.S. PATENT DOCUMENTS

| | | | | |
|---|---|---|---|---|
| 9,602,559 | B1* | 3/2017 | Barros | H04L 65/1089 |
| 9,704,029 | B2 | 7/2017 | Bourdev et al. | |
| 9,767,385 | B2 | 9/2017 | Nguyen et al. | |
| 2010/0121973 | A1* | 5/2010 | Lobacheva | G06F 40/279 |
| | | | | 709/231 |
| 2012/0148165 | A1* | 6/2012 | Yabu | G06K 9/6224 |
| | | | | 382/225 |
| 2013/0136416 | A1* | 5/2013 | Sathish | H04N 21/4826 |
| | | | | 386/239 |
| 2014/0324864 | A1* | 10/2014 | Choe | G06F 16/73 |
| | | | | 707/737 |
| 2015/0055931 | A1* | 2/2015 | Koivukangas | H04N 21/2743 |
| | | | | 386/228 |
| 2015/0154956 | A1* | 6/2015 | Brown | G06F 16/353 |
| | | | | 704/235 |
| 2016/0092736 | A1* | 3/2016 | Mai | G06K 9/4604 |
| | | | | 382/103 |
| 2016/0163311 | A1* | 6/2016 | Crook | G10L 15/065 |
| | | | | 704/275 |
| 2016/0171381 | A1* | 6/2016 | Brewer | G06N 20/00 |
| | | | | 706/11 |
| 2016/0266939 | A1* | 9/2016 | Shear | G06F 9/5072 |
| 2017/0344617 | A1* | 11/2017 | Sen | G06N 20/00 |
| 2018/0018142 | A1 | 1/2018 | Kim et al. | |
| 2018/0063601 | A1* | 3/2018 | Chee | H04N 21/44008 |
| 2018/0075300 | A1* | 3/2018 | Mai | G06K 9/00362 |
| 2018/0329744 | A1 | 11/2018 | Shear et al. | |

FOREIGN PATENT DOCUMENTS

| | | |
|---|---|---|
| CN | 103617435 A | 3/2014 |
| CN | 105279508 A | 1/2016 |
| CN | 107578015 A | 1/2018 |
| EP | 3 002 710 A1 | 4/2016 |
| TW | I267734 B | 12/2006 |
| TW | 201305923 A1 | 2/2013 |
| WO | WO 2016/159199 A1 | 10/2016 |
| WO | WO2017/177371 * | 10/2017 |
| WO | WO 2017/177371 A1 | 10/2017 |

OTHER PUBLICATIONS

Kodirov et al., "Person Re-identification by Unsupervised $\ell 1$ Graph Learning", 18 pages.

Li et al., "Human Reidentification with Transferred Metric Learning", 14 pages.

Nanda et al., "An unsupervised meta-graph clustering based prototype-specific feature quantification for human re-identification in video surveillance", Engineering Science and Technology, an International Journal, vol. 20, 2017, pp. 1041-1053.

Wang et al., "Graph Matching with Adaptive and Branching Path Following", IEEE Trans. on Pattern Analysis and Machine Intelligence 14 pages.

Zhou et al., "Robust and Efficient Graph Correspondence Transfer for Person Re-identification", May 15, 2018, 13 pages.

* cited by examiner

PERSON RE-IDENTIFICATION METHOD, PERSON RE-IDENTIFICATION SYSTEM AND IMAGE SCREENING METHOD

This application claims the benefit of Taiwan application Serial No. 108109409, filed Mar. 19, 2019, the disclosure of which is incorporated, by reference herein in its entirety.

TECHNICAL FIELD

The disclosure relates in general to a person re-identification method, a person re-identification system and an image screening method.

BACKGROUND

Machine learning and artificial intelligence have gradually become important in human life. Governments and industries of numerous countries have increased research and development budges for the fields of machine learning and artificial intelligence, in the aim of improving living quality of the human race and reducing inconvenience in life. The person re-identification technology can be applied to anti-terrorism and surveillance in public spaces (e.g., stations, malls and department stores) or private environment and, spaces. In a mall, the person re-identification technology can detect and track customers entering the mall. With the integration of other sensors, items picked by customers can be sensed in real time, and customers can then be allowed to exit the mall and thus complete a payment, without being required to, pay at a cashier. In an airport or a department store, passengers not yet boarded can be quickly located before an airplane takes off, or straying parents or children can be quickly found.

When the person re-identification technology performs recognition on an unknown person, the unknown person is compared with an identified person image set by using humanoid detection, face recognition and object tracking technologies. Because different features can be formed due to clothing styles or accessories carried by persons under different angles, and interference can be generated by different lighting, distances and backgrounds among different cameras, it is frequent that accurate results cannot be obtained by person identification.

SUMMARY

The disclosure is directed to a person re-identification method, a person re-identification system and an image screening method.

According to one embodiment of the disclosure, a person re-identification method provided includes the following steps. A plurality of identified images of an identified person are analyzed to obtain an interrelated array, which records a plurality of degrees of association among the identified images. The interrelated array is converted to a directed graph, which has at least one connected group. A representative path of each connected group is obtained. According to the representative paths, a part of the identified images are outputted as at least one representative image set for performing a person re-identification process on an image to be identified.

According to another embodiment of the disclosure, a person re-identification system provided includes an association calculation unit, a directed graph establishment unit, a path analysis unit and a selection unit. The association calculation unit analyzes a plurality of identified images of an identified person to obtain an interrelated array, which records a plurality of degrees of association among the identified images. The directed graph establishment unit converts the interrelated array to a directed graph, which has at least one connected group. The path analysis unit obtains a representative path of each connected group. The selection unit outputs, according to the representative paths, a part of the identified images as a representative image set for performing a person re-identification process on an image to be identified.

According to yet another embodiment of the present invention, an image screening method provided includes the following steps. A plurality of identified images are analyzed to obtain an interrelated array, which records a plurality of degrees of association among the identified images. The interrelated array is a directed graph, which has at least one connected group. A representative path of each connected group is obtained. According to the representative paths, a part of the identified images are outputted as at least one representative image set.

To better understand the above and other aspect of the disclosure, embodiments are described in detail with the accompanying drawings below.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Various embodiments are described to explain how the disclosure uses an appropriate image screening method to improve accuracy and operation speed of the person re-identification technology. However, the contents disclosed in the embodiments are not to be construed as limitations to the claimed scope of the disclosure.

Figure 1:
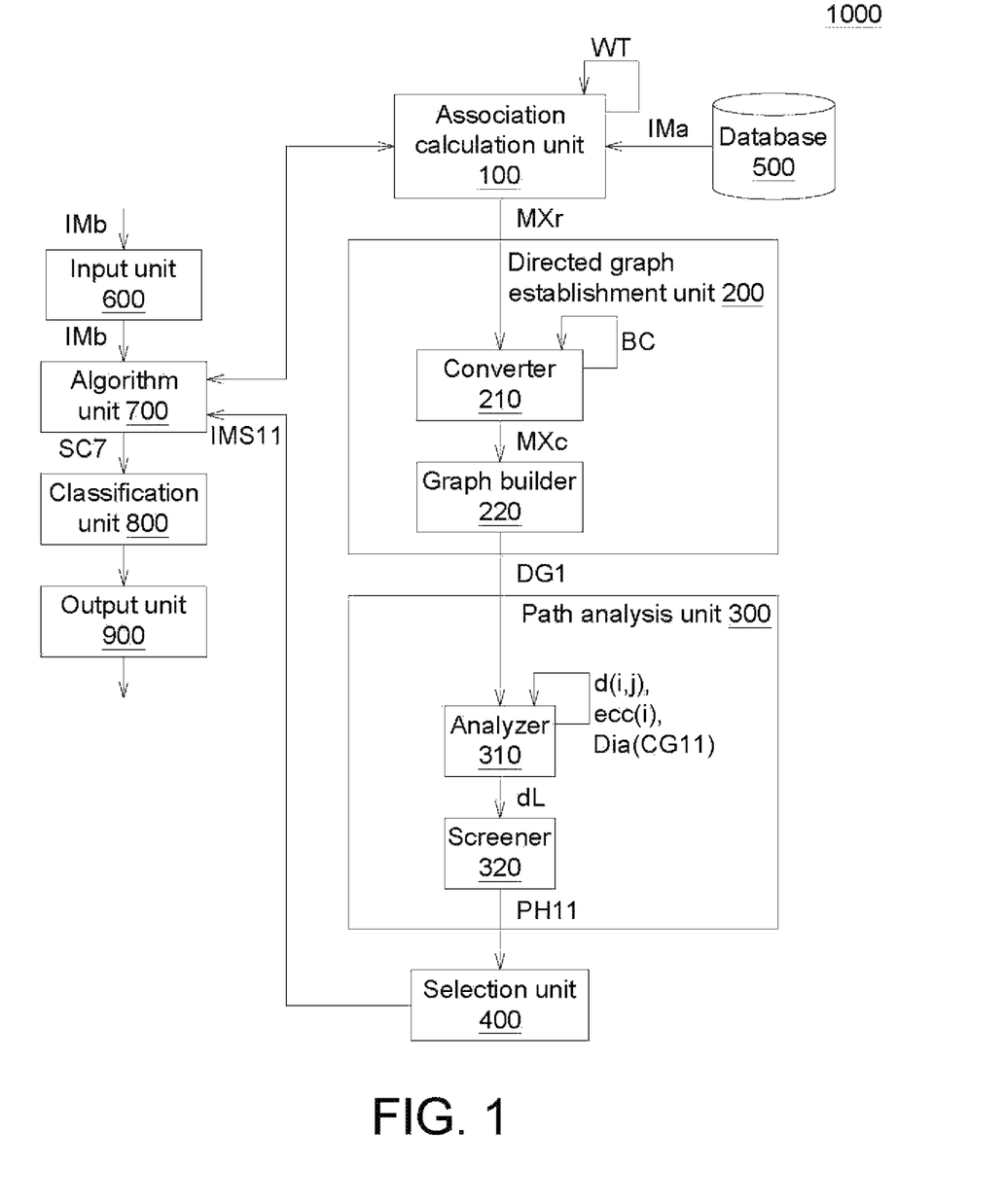
FIG. 1 is a schematic diagram of a person re-identification system according to an embodiment.

FIG. 1 shows a schematic diagram of a person re-identification system 1000 according to an embodiment. The person re-identification system 1000 includes an association calculation unit 100, a directed graph establishment unit 200, a path analysis unit 300, a selection unit 400, a database 500, an input unit 600, an algorithm unit 700, a classification unit 800 and an output unit 900. The directed graph establishment unit 200 includes a converter 210 and a graph builder 220. The path analysis unit 300 includes an analyzer 310 and a screener 320. Each of the association calculation unit 100, the directed graph establishment unit 200, the converter 210, the graph builder 220, the path analysis unit 300, the analyzer 310, the screener 320, the selection unit 400, the algorithm unit 700 and the classification unit 800 is, for example, a circuit, a chip, a circuit board, one or more codes, or a storage device storing codes. The algorithm unit 700 performs, for example, a convolutional neural network (CNN) algorithm, a k-means algorithm, or a decision tree algorithm. The database 500 is, for example, a memory, a hard drive, or a cloud storage center. Each of the input unit 600 and the output unit 900 is, for example, a wireless network transmission device, wired network transmission device, a memory card access device, a connection port, a keyboard, a monitor, or a combination thereof.

In the disclosure, the association calculation unit 100, the directed graph establishment unit 200, the path analysis unit 300 and the selection unit 400 perform an "image screening process". In the image screening process, a most symbolic representative image set IMS11. The accuracy of the person re-identification technology can be improved by using the representative image set IMS11.

The input unit 600, the algorithm unit 700, the classification unit 800 and the output unit 900 perform a "person re-identification process". In the "person re-identification process", by using an image IMb to be identified of an unidentified person, it is determined whether the unidentified person is similar to a particular identified person or it is determined to which identified person the unidentified person is most similar. Operation details of the above components are described in detail with an accompanying flowchart below.

Figure 2:
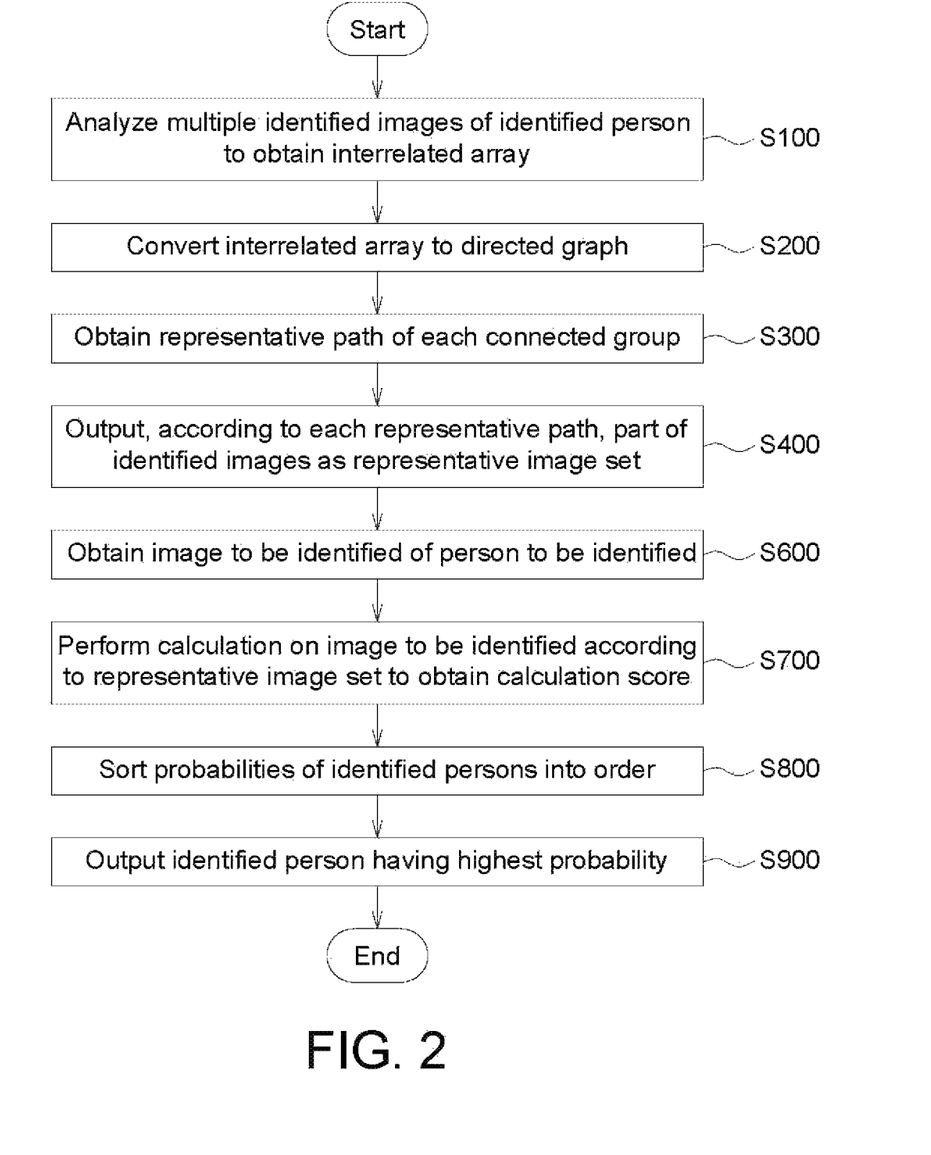
FIG. 2 shows a flowchart of a person re-identification method according to an embodiment.

FIG. 2 shows a flowchart of a person re-identification method according to an embodiment. Referring to FIG. 2, steps S100 to S400 are the image screening process, and steps S600 to S900 are the person re-identification process. In one embodiment, the image screening process can be performed offline, and the person re-identification process cab be performed online.

Figure 3:
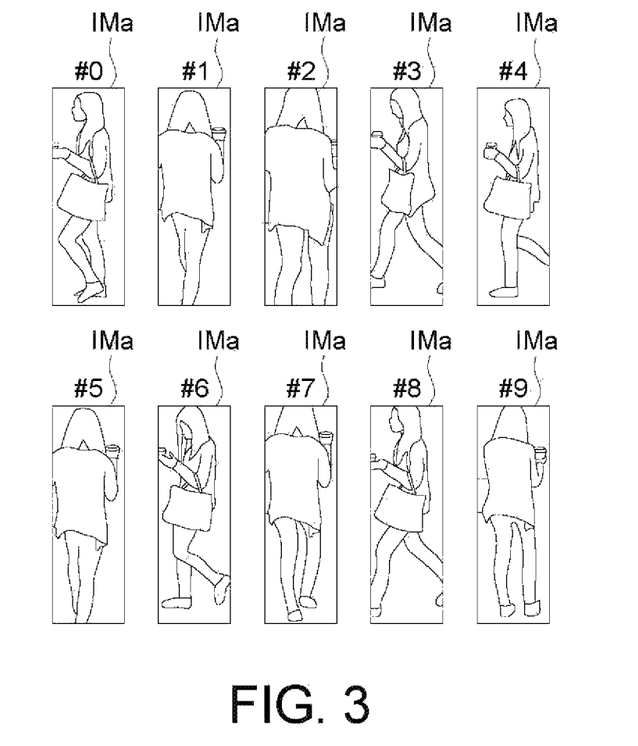
FIG. 3 shows a schematic diagram of identified images according to an embodiment.

The image screening process of steps S100 to S400 is described below. In step S100, the association calculation unit 100 analyzes multiple identified images IMa of an identified person to obtain an interrelated array MXr. FIG. 3 shows a schematic diagram of identified images IMa according to an embodiment. As shown in FIG. 3, ten identified images IMa are stored in the database 500. A corresponding identified person has been determined for each of the identified images IMa, and the identified images IMa correspond to the same identified person. Table-1 below shows the interrelated array MXr recording 10*10 degrees of association WT among the ten identified images IMa.

TABLE 1

|  | #0 | #1 | #2 | #3 | #4 | #5 | #6 | #7 | #8 | #9 |
|---|---|---|---|---|---|---|---|---|---|---|
| #0 | 1 | 0 | 0 | 1 | 1 | 0 | 1 | 0 | 0.743 | 0 |
| #1 | 0 | 1 | 1 | 0.987 | 0.025 | 1 | 0.184 | 1 | 0.941 | 1 |
| #2 | 0 | 1 | 1 | 0.02 | 0.078 | 1 | 0.004 | 1 | 0.133 | 1 |
| #3 | 1 | 0 | 0 | 1 | 1 | 0.001 | 1 | 0 | 0.999 | 0 |
| #4 | 1 | 0.491 | 0.001 | 1 | 1 | 0.281 | 1 | 0.151 | 1 | 0.924 |
| #5 | 0 | 1 | 1 | 0.004 | 0.001 | 1 | 0.282 | 1 | 0.394 | 1 |
| #6 | 1 | 0.924 | 0 | 1 | 1 | 0.954 | 1 | 0.511 | 1 | 0.207 |
| #7 | 0 | 0.999 | 1 | 0 | 0 | 1 | 0.004 | 1 | 0.021 | 1 |
| #8 | 0.994 | 0.07 | 0.006 | 0.999 | 1 | 0.137 | 0.997 | 0.176 | 1 | 0.338 |
| #9 | 0 | 1 | 1 | 0.296 | 0 | 1 | 0.346 | 1 | 0.183 | 1 |

The range of the degree of association WT is 0 to 1, where 0 represents no association at all and 1 represents full association. In one embodiment, the degree of association WT can be calculated by the algorithm unit 700 by using a convolutional neural network (CNN) algorithm. For example, the #3 identified image IMa is a side view, and the #5 identified image IMa is a rear view, and the #8 identified image IMa is a side view; the degree of association WT of the #3 identified image IMa with respect to the #5 identified image IMa is 0.001, which is low (one is a side view and one is a rear view); the degree of association WT of the #3 identified image IMa with respect to the #8 identified image IMa is 0.999, which is high (both are side views).

Figure 4:
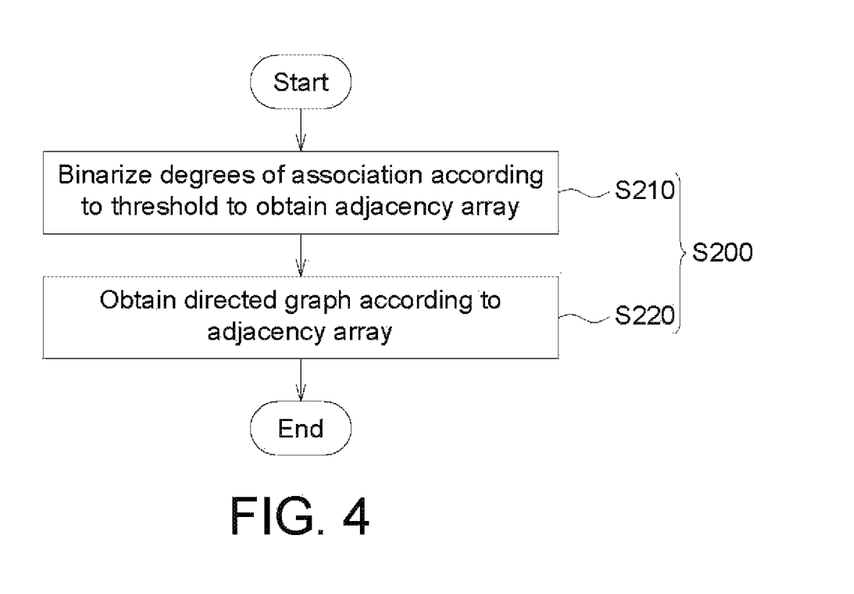
FIG. 4 shows a detailed flowchart of step S200.

In step S200 in FIG. 2, the directed graph establishment unit 200 converts the interrelated array MXr to a directed graph DG1. FIG. 4 shows a detailed flowchart of step S200. Referring to FIG. 4, step S200 includes steps S210 and S220. In step S210 in FIG. 4, the converter 210 of the directed graph establishment unit 200 binarizes the degrees of association WT to multiple binary values BC (0 or 1) according to a threshold (e.g., 0.9) to obtain an adjacency array MXc. Table-2 shows the adjacency array MXc.

TABLE 2

|  | #0 | #1 | #2 | #3 | #4 | #5 | #6 | #7 | #8 | #9 |
|---|---|---|---|---|---|---|---|---|---|---|
| #0 | 1 | 0 | 0 | 1 | 1 | 0 | 1 | 0 | 0 | 0 |
| #1 | 0 | 1 | 1 | 1 | 0 | 1 | 0 | 1 | 1 | 1 |
| #2 | 0 | 1 | 1 | 0 | 0 | 1 | 0 | 1 | 0 | 1 |
| #3 | 1 | 0 | 0 | 1 | 1 | 0 | 1 | 0 | 1 | 0 |
| #4 | 1 | 0 | 0 | 1 | 1 | 0 | 1 | 0 | 1 | 1 |
| #5 | 0 | 1 | 1 | 0 | 0 | 1 | 0 | 1 | 0 | 1 |
| #6 | 1 | 1 | 0 | 1 | 1 | 1 | 1 | 0 | 1 | 0 |
| #7 | 0 | 1 | 1 | 0 | 0 | 1 | 0 | 1 | 0 | 1 |
| #8 | 1 | 0 | 0 | 1 | 1 | 0 | 1 | 0 | 1 | 0 |
| #9 | 0 | 1 | 1 | 0 | 0 | 1 | 0 | 1 | 0 | 1 |

A binary value BC in "0" represents a low degree of association WT, and a binary value BC in "1" represents a high degree of association WT. In another embodiment, the threshold can also be 0.8, 0.85, 0.9 or 0.95. The number of binary value BC in "1" in the adjacency array MXc decreases as the threshold gets higher, and increases as the threshold gets lower.

Figure 5:
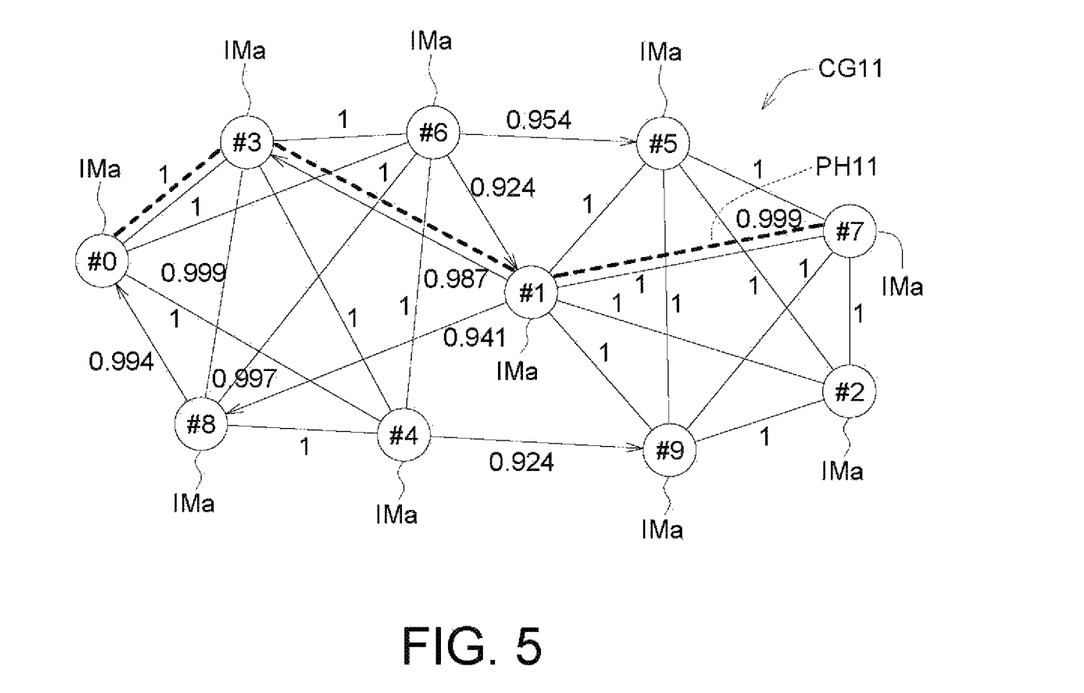
FIG. 5 shows a directed graph according to an embodiment.

In step S220 in FIG. 4, the graph builder 220 obtains the directed graph DG1 according to the adjacency array MXc. FIG. 5 shows the directed graph DG1 according to an embodiment. Referring to FIG. 5, the graph builder 220 establishes unidirectional connecting edges for binary values BC in "1" in the adjacency array MXc. Arrows are not drawn for bidirectional connecting edges to keep the directed graph DG1 clear. For example, in the adjacency array MXc, the #8 identified image IMa has a unidirectional connecting edge with respect to the #0 identified image IMa, and the #0 identified image IMa does not have a unidirectional connecting edge with respect to the #8 identified image; thus, the graph builder 220 draws a unidirectional connecting edge with an arrow from the $8^{th}$ node to the $0^{th}$ node. The #4 identified image IMa has a unidirectional connecting edge with respect to the #6 identified image IMa, and the #6 identified image IMa has a unidirectional connecting edge with respect to the #4 identified image IMa; thus, the graph builder 220 draws a connecting edge without any arrow between the $4^{th}$ node and the $6^{th}$ node. In the directed graph DG1, the degree of association WT is indicated for each connecting edge.

As shown in FIG. 5, all of the identified images IMa in the directed graph are interconnected to form a connected group CG11.

Figure 6:
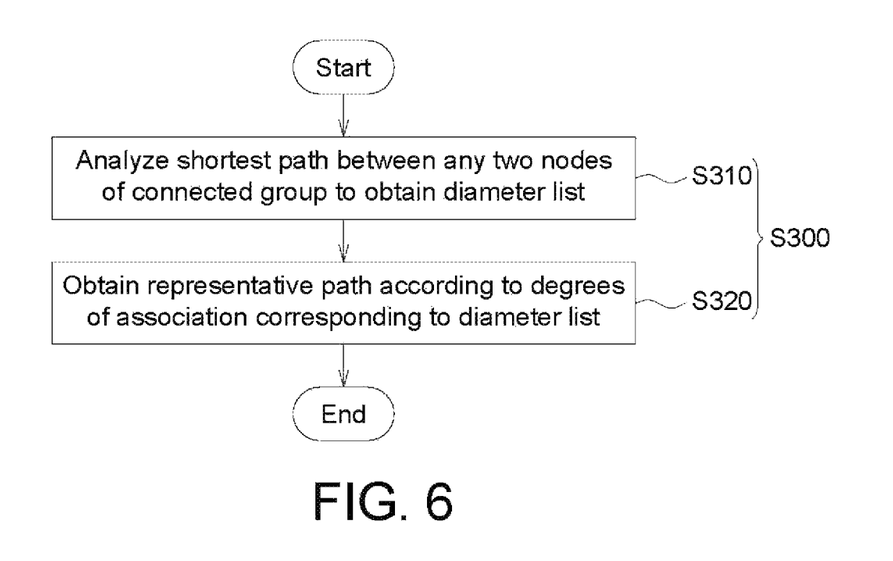
FIG. 6 shows a detailed flowchart according to an embodiment.

In step S300 in FIG. 2, the path analysis unit 300 obtains a representative path PH11 of each connected group CG11. FIG. 6 shows a detailed flowchart of step S300. Referring to FIG. 6, step S300 includes steps S310 and S320. In step S310 in FIG. 6, the analyzer 310 of the path analysis unit 300 analyzes a shortest path d(i, j) between any two nodes of each connected group CG11 to obtain a diameter list dL.

In the connected group CG11, there may be multiple paths between an $i^{th}$ node and a $j^{th}$ node, with a shortest path d(i, j). The calculation for the length of a path involves the quantity of connecting edges (without considering the degree of association WT). As equation (1) below, among multiple shortest paths d(i, j) from the $i^{th}$ node to other nodes, the longest is defined as an eccentric distance ecc(i) of the $i^{th}$ node.

$$ecc(i)=\max_{j \in CG11}d(i,j) \quad (1)$$

As equation (2) below, the largest eccentric distance ecc(i) is defined as a diameter Dia(CG11).

$$Dia(CG11)=\max_{j \in CG11}ecc(i)=\max_{i,j \in CG11}d(i,j) \quad (2)$$

That is to say, the diameter Dia(CG11) represents the longest path connecting any two nodes in the connected group CG11. There may be multiple diameters Dia(CG11), each of which is recorded in the diameter list dL.

In step S320 in FIG. 6, the screener 320 obtains the representative path PH11 according to the degrees of association WT corresponding to the diameter list dL. In this step, the screener 320 sums up the degrees of association WT of the connecting edges for each diameter Dia(CG11), and uses the largest sum as the representative path PH11. As shown in FIG. 5, the representative paths PH11 of the connected group CG11 are "the $0^{th}$ node, the $3^{rd}$ node, the $1^{st}$ node and the $7^{th}$ node".

Figure 7:
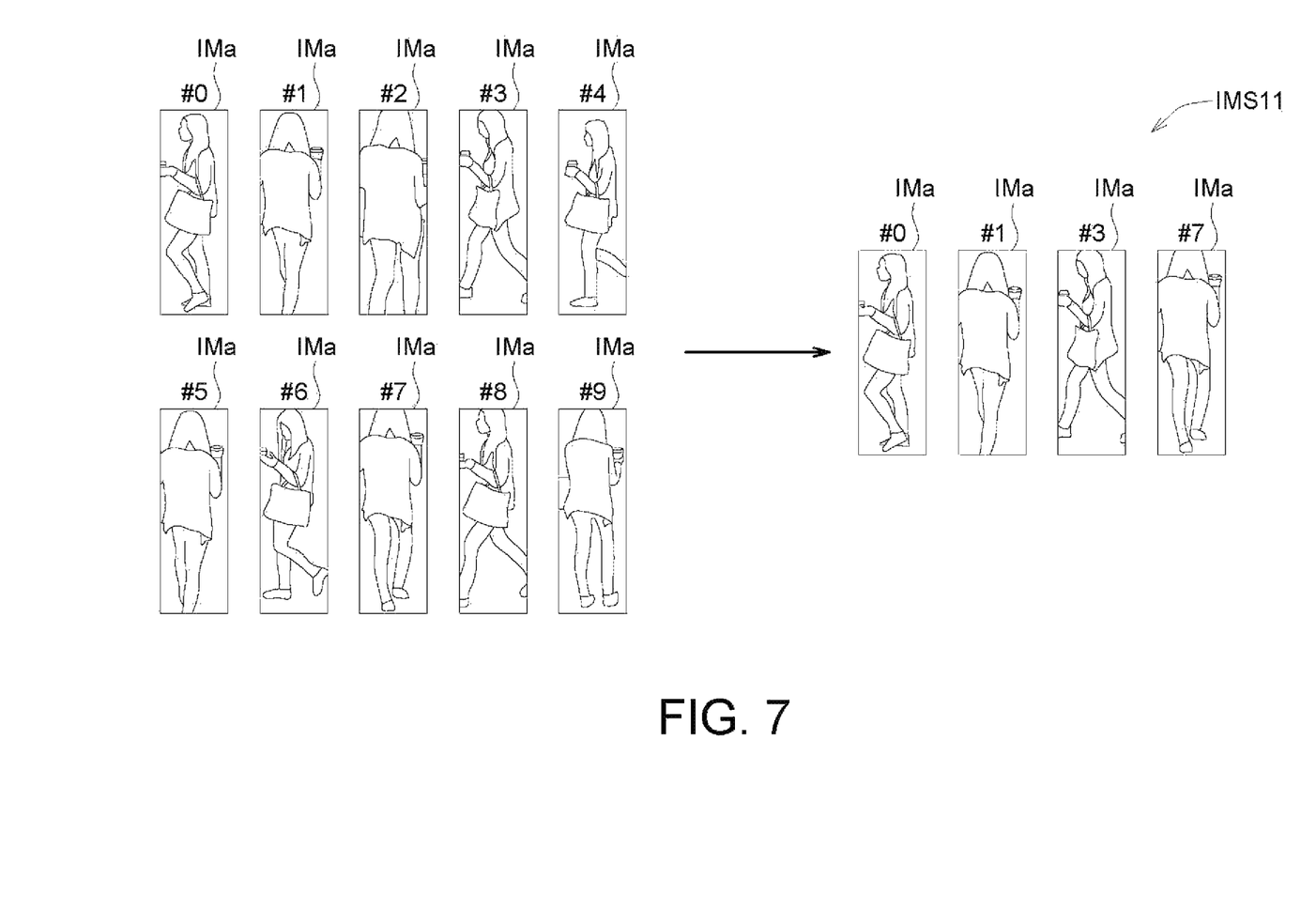
FIG. 7 illustrates a representative image set of FIG. 5.

In step S400 in FIG. 2, the selection unit 400 outputs, according to the representative path PH11, a part of the identified images IMa as a representative image set IMS11. FIG. 7 illustrates the representative image set IMS11. For example, according to the representative path PH11 (i.e., "the $0^{th}$ node, the $3^{rd}$ node, the $1^{st}$ node and the $7^{th}$ node"), the selection unit 400 can output the representative image set IMS11 including "the #0 identified image IMa, the #1 identified image IMa, the #3 identified image IMa, and #7 identified image IMa".

According to steps S100 to S400 above, the association calculation unit 100, the directed graph establishment unit 200, the path analysis unit 300 and the selection unit 400 have completed the "image screening process", such that four identified image IMa are selected from the ten identified images IMa to form the representative image set IMS11. The representative image set IMS11 can fully represent the contents of the ten identified images IMa, thus effectively improving the accuracy and operation speed of the person re-identification technology.

Next, how the person re-identification process is performed by using the representative image set IMS11 is described below. In step S600 in FIG. 2, the input unit 600 obtains an image IMb to be identified of an identified person to be identified.

In step S700 in FIG. 2, the algorithm unit 700 performs calculation on the image IMb to be identified according to the representative image set IMS11 to obtain a calculation score SC7. In another embodiment, the algorithm unit 700 can also obtain another calculation score (not shown) according to another representative image set (not shown) of another identified person.

In step S800 in FIG. 2, the classification unit 800 sorts probabilities of identified persons into an order. In step S900 in FIG. 2, the output unit 900 outputs the identified person having the highest probability. Thus, the input unit 600, the algorithm unit 700, the classification unit 800 and the output unit 900 have completed the person re-identification process, and have identified whether the unidentified person is similar to a particular identified person or whether the unidentified person is most similar to a particular identified person.

Figure 8:
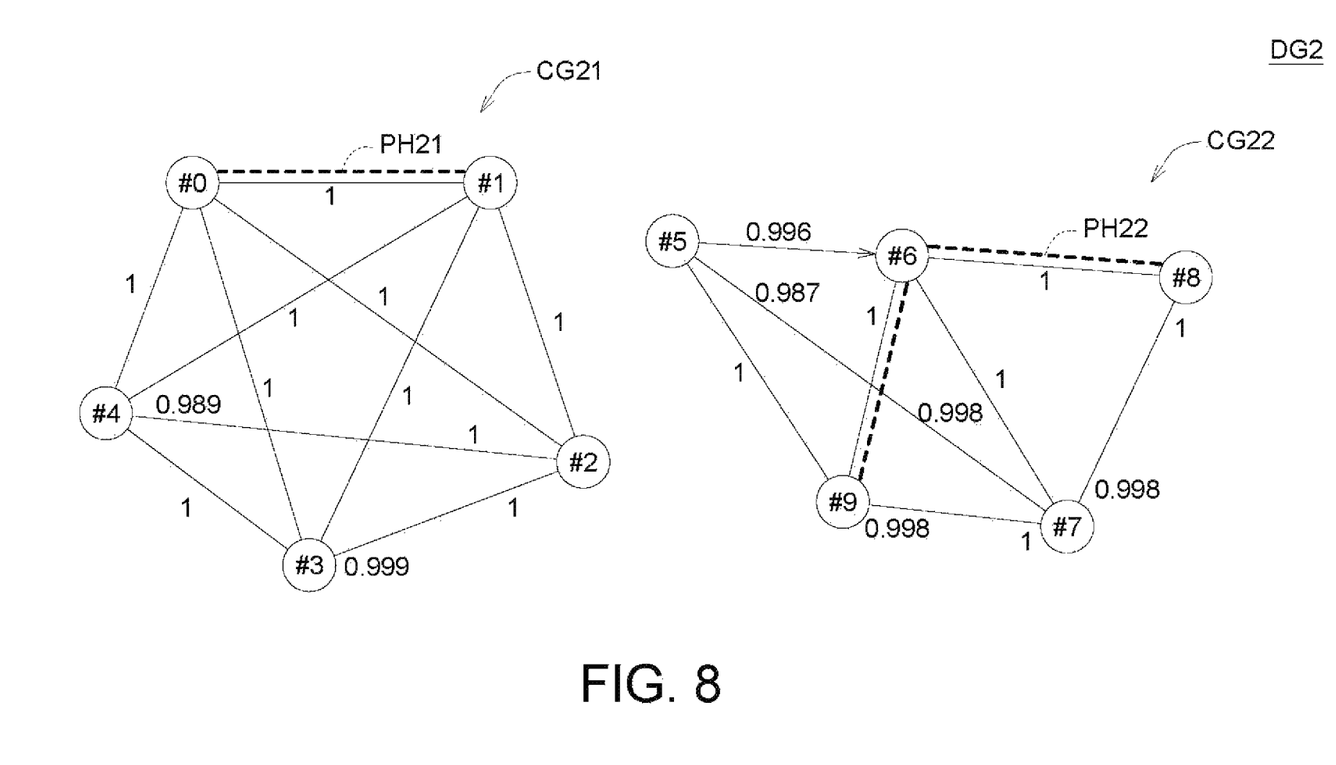
FIG. 8 shows a schematic diagram of a directed graph according to another embodiment.
Figure 9:
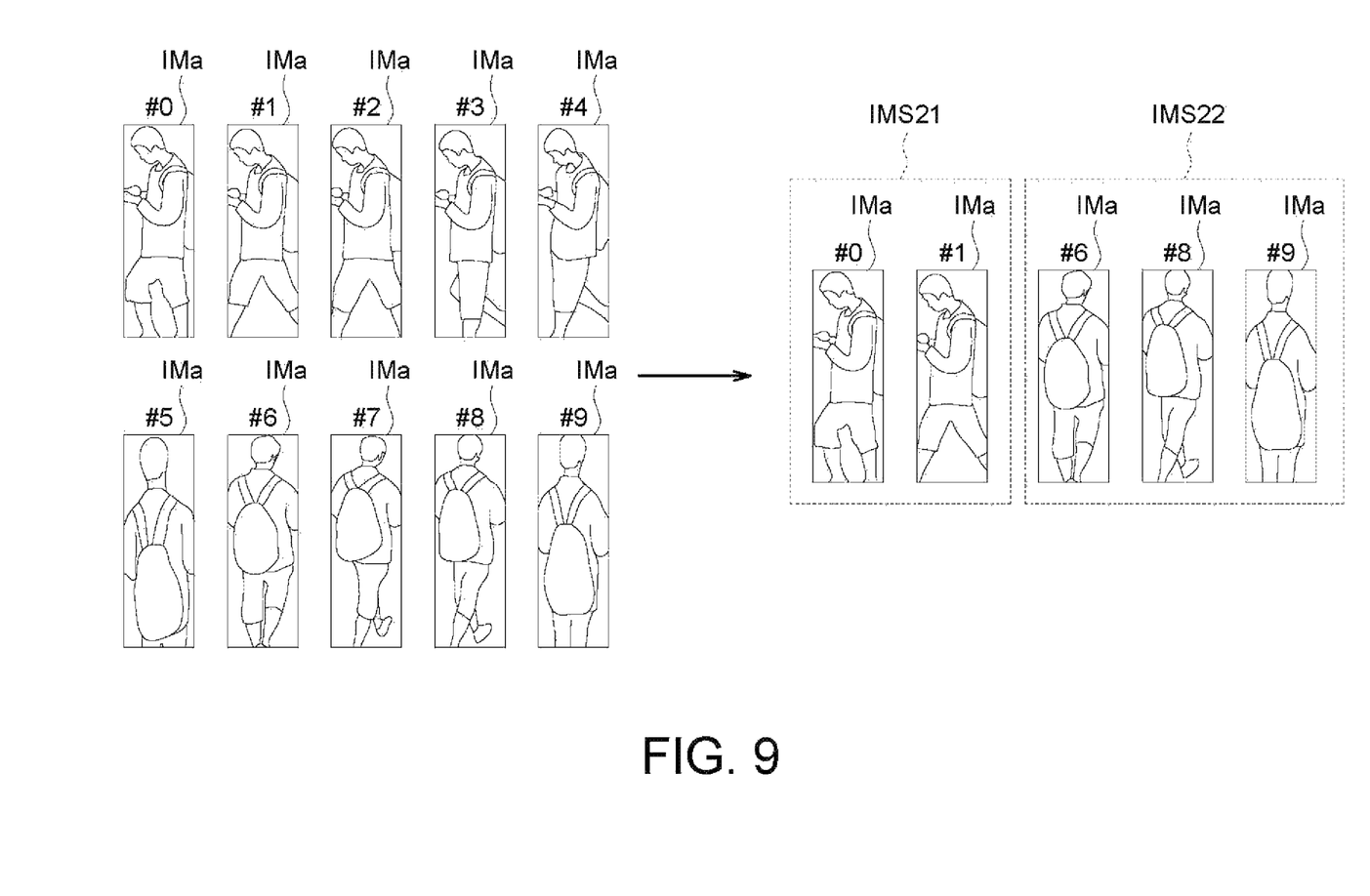
FIG. 9 illustrates a representative image set in FIG. 8.

In the embodiment above, the quantity of the connected group CG11 of the directed graph DG1 is one, and the quantity of the representative path PH11 obtained is one. However, the disclosure is not limited to the above examples; the quantity of the connected group can be greater than or equal to two, and the quantity of the representative path can also be greater than or equal to two. FIG. 8 shows a schematic diagram of a directed graph DG2 according to another embodiment. In the embodiment in FIG. 8, the directed graph DG2 has two connected groups CG21 and CG22. After the calculation performed by the path analysis unit 300, a representative path PH21 ("the 0th node and the $1^{st}$ node") of the connected group CG21 and a representative path PH22 (the $9^{th}$ node, the $6^{th}$ node and the $8^{th}$ node) of the connected group CG22 are obtained in step S300. FIG. 9 illustrates representative image sets IMS21 and IMS22. The selection unit 400 outputs, according to the representative paths PH21 and PH22, the representative image set IMS21 ("the #0 identified image IMa, and the #1 identified image IMa) and the representative image set IMS22 ("the #6 identified image IMa, the #8 identified image IMa and the #9 identified image IMa"). According to the multiple representative image sets IMS21 and IMS22 obtained, the algorithm unit 700 obtains multiple calculation scores in step S700, and uses the highest as the calculation score of the directed graph DG2.

Figure 10:
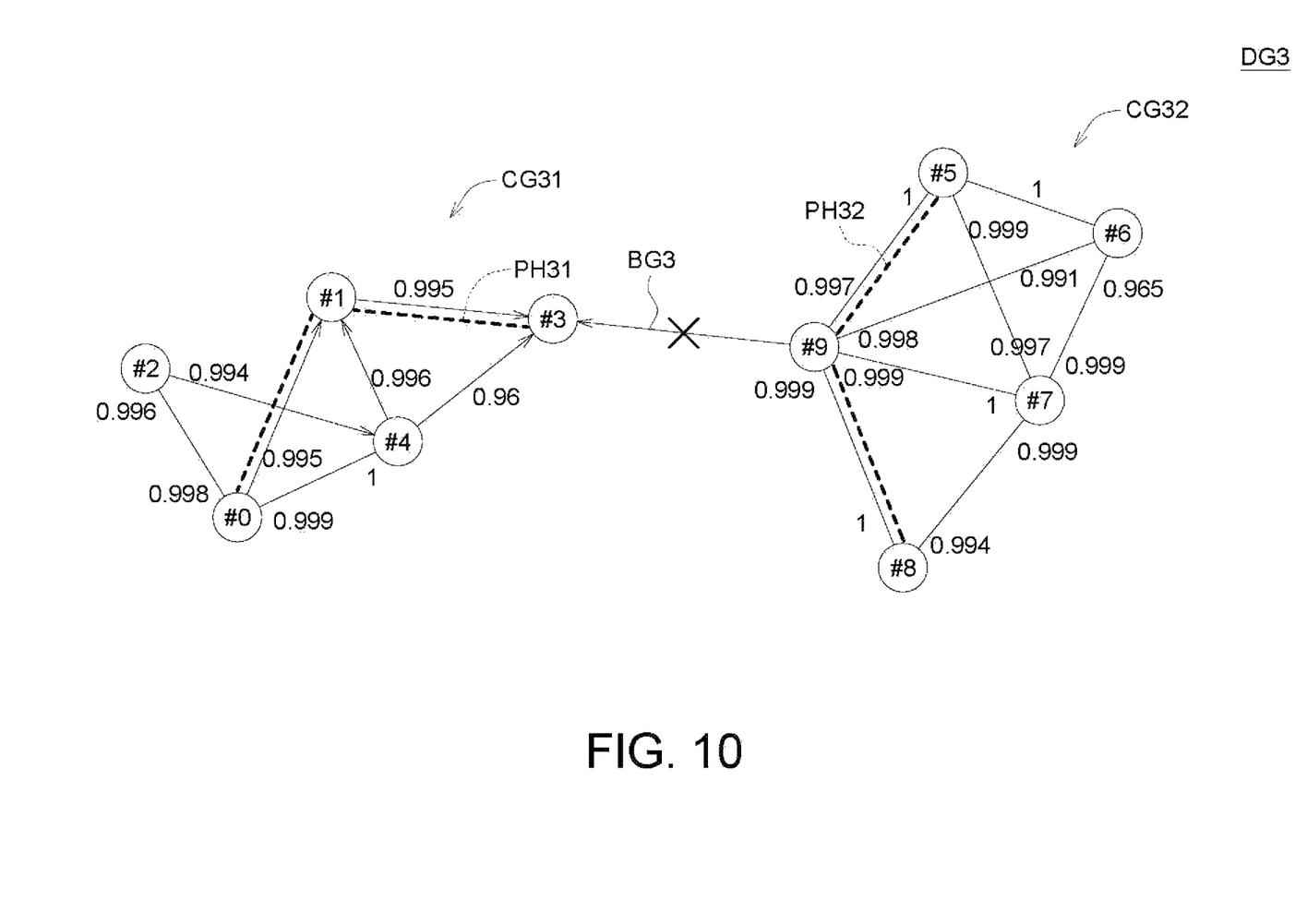
FIG. 10 shows a schematic diagram of a directed graph according to another embodiment.
Figure 11:
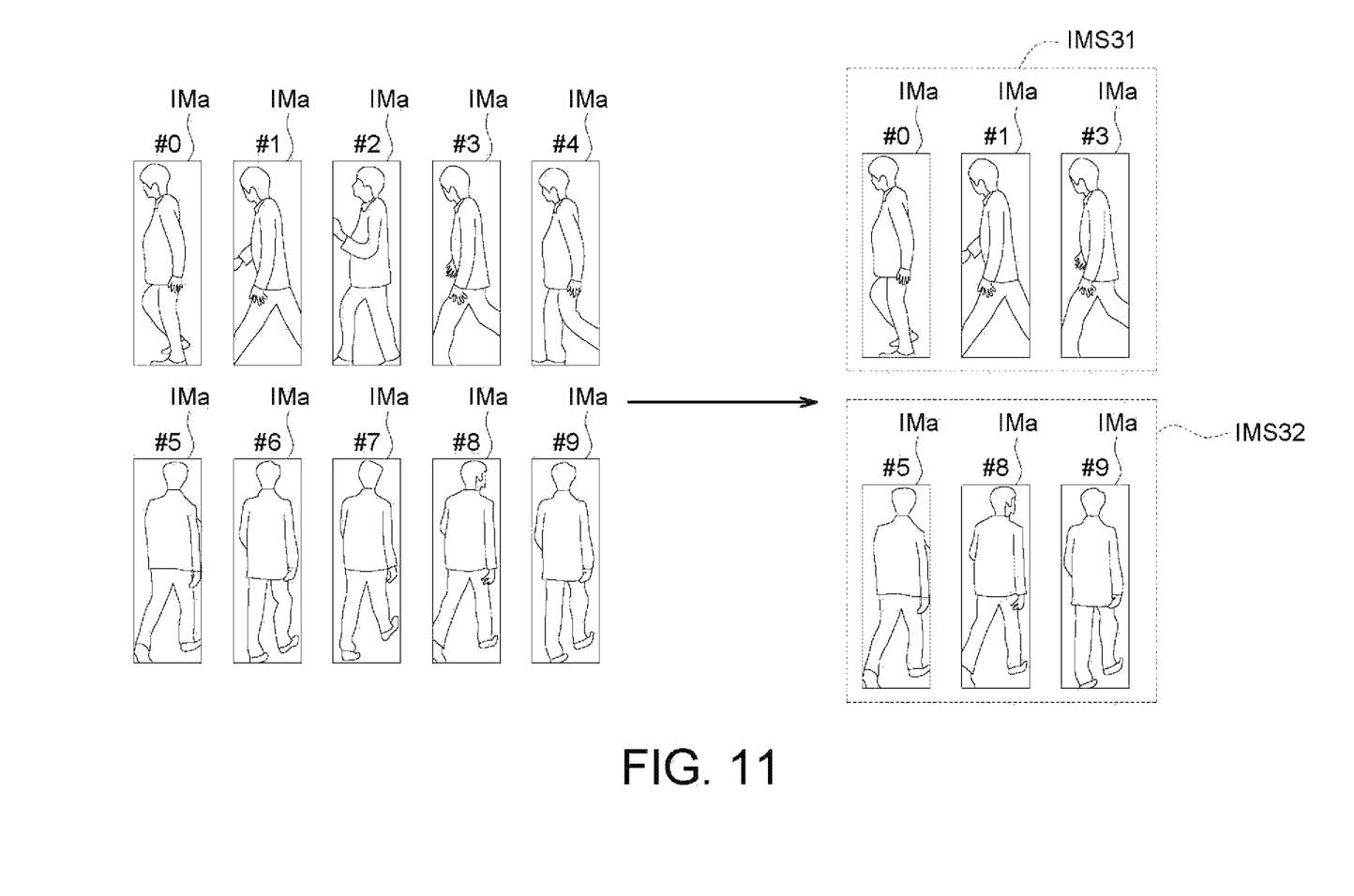
FIG. 11 illustrates a representative image set in FIG. 10.

Alternatively, FIG. 10 shows a schematic diagram of a directed graph DG3 according to yet another embodiment. In the embodiment in FIG. 10, the path analysis unit 300 performs analysis and determines that the directed graph DG3 has a bridge BG3 for connection. The path analysis unit 300 deletes the bridge BG3 and obtains two connected groups CG31 and CG32 (the quantity of connected groups is added by one). After the calculation performed by the path analysis unit 300, a representative path PH31 ("the $0^{th}$ node, the $1^{st}$ node and the $3^{rd}$ node") of the connected group CG31 and a representative path PH32 ("the $8^{th}$ node, the $9^{th}$ node and the 5$^{th}$ node") of the connected group CG32 are obtained in step S300. When the path analysis unit 300 performs calculation, the representative path PH31 is caused to include the 3$^{rd}$ node of the bridge BG3, and the representative path PH32 is caused to include the 9$^{th}$ node of the bridge BG3; that is, when the path analysis unit 300 performs calculation, the representative path calculated is caused to include the nodes on the two ends of the bridge BG3. Thus, when a directed graph includes a bridge, the path analysis unit 300 performs calculation to obtain at least two representative paths. FIG. 11 illustrates representative image sets IMS31 and IMS32. The selection unit 400 outputs the representative image set IMS31 ("the #0 identified image IMa, the #1 identified image IMa, and the #3 identified image") and the representative image set IMS32 ("the #5 identified image IMa, the #8 identified image IMa, and the #9 identified image IMa) in step S400. According to the multiple representative image sets IMS31 and IMS32 obtained, the algorithm unit 700 can obtain multiple calculation scores in step S700, and use the largest as the calculation score of the directed graph DG3.

FIG. 5, FIG. 8 and FIG. 10 respectively illustrate three forms of the directed graphs DG1, DG2 and DG3. In one embodiment, for different thresholds used in step S210, the directed graph generated in step S220 may be changed in form.

Figure 12:
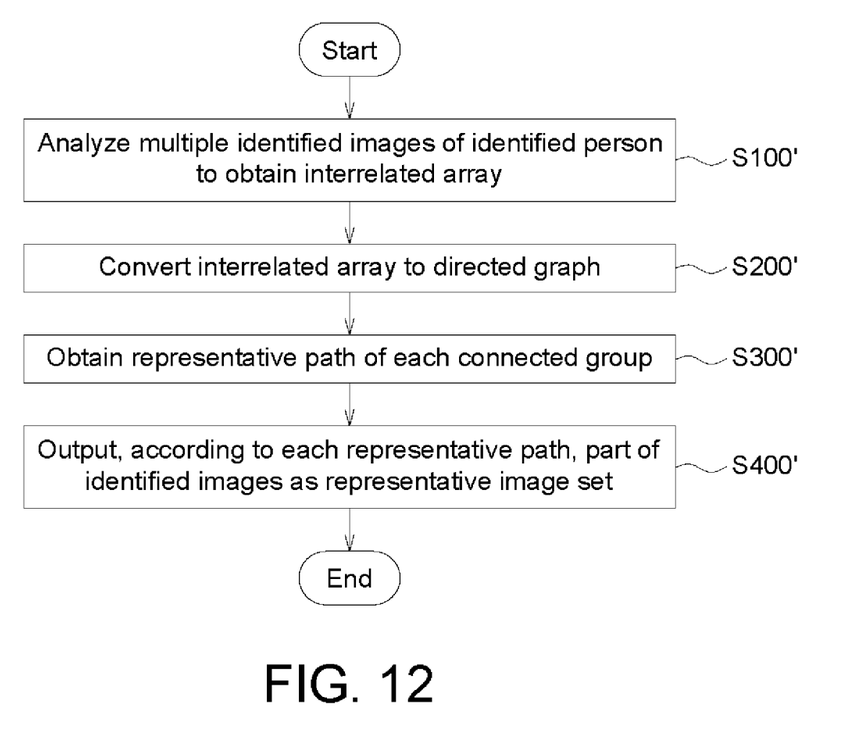
FIG. 12 shows a flowchart of an image screening method according to another embodiment.

Further, the image screening process used in the embodiments above is not limited to applications of a person re-identification. FIG. 12 shows a flowchart of an image screening method according to another embodiment. The image screening process in FIG. 12 can be extensively applied to other fields, such as a fingerprint recognition process, an object recognition process, a medical symptom recognition process, a human face recognition process, and a plant texture identification process. Steps S100' to S400' are respectively similar to steps S100 to S400 above, and are not further described herein.

According to the embodiments above, by analyzing the interrelated array MXr, the adjacency array MXc, the directed graph DG1 (the directed graph DG2, or the directed graph DG3), and the representative path PH11 (or the representative path PH21, the representative path PH22, the representative path PH31, or the representative path PH32), the symbolic representative image set IMS11 (the representative image set IMS21, the representative image set IMS22, the representative image set IMS31, or the representative image set IMS32) is obtained. Thus, the accuracy and operation speed of the person re-identification technology are effectively improved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A person re-identification method, comprising:
    analyzing a plurality of identified images each of which includes only one identified person to obtain an interrelated array, the interrelated army recording a plurality of degrees of association of the identified images, wherein each of the identified images corresponds to the same person, and the interrelated array is obtained by analyzing the identified images;
    converting the interrelated array to a directed graph, the directed graph having at least one connected group, wherein the number of nodes in the directed graph equals to the number of the identified images;
    obtaining a representative path of each of the at least one connected group; and
    outputting, according to each of the at least one of the representative path, a part of the identified images as at least one representative image set for performing a person re-identification process on an image to be identified.

2. The person re-identification method according to claim 1, wherein the step of converting the interrelated array to the directed graph comprises:
    binarizing the degrees of association into a plurality of binary values according to a threshold to obtain an adjacency array; and
    obtaining the directed graph according to the adjacency array.

3. The person re-identification method according to claim 2, wherein the threshold is 0.8, 0.85, 0.9 or 0.95.

4. The person re-identification method according to claim 1, wherein the step of obtaining the representative path of each of the at least one connected group comprises:
    performing analysis to determine a shortest path between any two nodes of each of the at least one connected group to obtain a diameter list; and
    obtaining each of the representative path according to the degrees of association corresponding to each of the diameter list.

5. The person re-identification method according to claim 4, wherein the diameter list comprises a plurality of diameters, and a length of each of the diameters is a maximum value of lengths of the shortest paths.

6. The person re-identification method according to claim 1, wherein a quantity of the at least one connected group is one, and a quantity of the at least one representative path is one.

7. The person re-identification method according to claim 1, wherein a quantity of the at least one connected group is plural, and a quantity of the at least one representative path is plural.

8. The person re-identification method according to claim 1, wherein the directed graph further comprises a bridge, a quantity of the at least one connected group is added by one when the bridge is deleted, the bridge connects two of the connected groups, a quantity of the at least one representative path is at least two, and the representative paths comprise two nodes of the bridge.

9. A person re-identification system, comprising:
    an association calculation unit, analyzing a plurality of identified images each of which includes only one identified person to obtain an interrelated array, the interrelated array recording a plurality of degrees of association of the identified images, wherein each of the identified images corresponds to the same person, and the interrelated array is obtained by analyzing the identified images;
    a directed graph establishment unit, converting the interrelated array to a directed graph, the directed graph having at least one connected group, wherein the number of nodes in the directed graph equals to the number of the identified images;
    a path analysis unit, obtaining a representative path of each of the at least one connected group;
    a selection unit, outputting, according to each of the at least one of the representative path, a part of the identified images as at least one representative image set for performing a person re-identification process on an image to be identified.

10. The person re-identification system according to claim 9, wherein the directed graph establishment unit comprises:
   a converter, binarizing the degrees of association into a plurality of binary values according to a threshold to obtain an adjacency array; and
   a graph builder, obtaining the directed graph according to the adjacency array.

11. The person re-identification system according to claim 10, wherein the threshold is 0.8, 0.85, 0.9 or 0.95.

12. The person re-identification system according to claim 9, wherein the path analysis unit comprises:
   an analyzer, performing analysis to determine a shortest path between any two nodes of each of the at least one connected group to obtain a diameter list; and
   a screener, obtaining each of the representative path according to the degrees of association corresponding to each of the diameter list.

13. The person re-identification system according to claim 12, wherein the diameter list comprises a plurality of diameters, and a length of each of the diameters is a maximum value of lengths of the shortest paths.

14. The person re-identification system according to claim 9, wherein a quantity of the at least one connected group is one, and a quantity of the at least one representative path is one.

15. The person re-identification system according to claim 9, wherein a quantity of the at least one connected group is plural, and a quantity of the at least one representative path is plural.

16. The person re-identification system according to claim 9, wherein the directed graph further comprises a bridge, a quantity of the at least one connected group is added by one when the bridge is deleted, the bridge connects two of the connected groups, a quantity of the at least one representative path is at least two, and the representative paths comprise two nodes of the bridge.

17. An image screening method, comprising:
   analyzing a plurality of identified images each of which includes only one identified person to obtain an interrelated array, the interrelated array recording a plurality of degrees of association of the identified images, wherein each of the identified images corresponds to the same person, and the interrelated array is obtained by analyzing the identified images;
   converting the interrelated array to a directed graph, the directed graph having at least one connected group, wherein the number of nodes in the directed graph equals to the number of the identified images;
   obtaining a representative path of each of the at least one connected group; and
   outputting, according to each of the at least one of the representative path, a part of the identified images as at least representative image set.

18. The image screening method according to claim 17, wherein the step of converting the interrelated array to the directed graph comprises:
   binarizing the degrees of association into a plurality of binary values according to a threshold to obtain an adjacency array; and
   obtaining the directed graph according to the adjacency array.

19. The image screening method according to claim 17, wherein the step of obtaining the representative path of each of the at least one connected group comprises:
   performing analysis to determine a shortest path between any two nodes of each of the at least one connected group to obtain a diameter list; and
   obtaining each of the representative path according to the degrees of association corresponding to each of the diameter list.

20. The image screening method according to claim 19, wherein the diameter list comprises a plurality of diameters, and a length of each of the diameters is a maximum value of lengths of the shortest paths.

* * * * *